US012735023B2

(12) United States Patent
Shin et al.

(10) Patent No.: US 12,735,023 B2
(45) Date of Patent: Sep. 15, 2026

(54) METHOD OF CONTROLLING TOWING MODE OF ECO-FRIENDLY VEHICLE

(71) Applicants: Hyundai Motor Company, Seoul (KR); Kia Corporation, Seoul (KR)

(72) Inventors: Dong Jun Shin, Hwaseong-Si (KR); Hyo Jun Kawk, Suwon-Si (KR); Jin Cheol Shin, Hwaseong-Si (KR); Kyung Hun Hwang, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 274 days.

(21) Appl. No.: 18/130,783

(22) Filed: Apr. 4, 2023

(65) Prior Publication Data

US 2024/0149863 A1 May 9, 2024

(30) Foreign Application Priority Data

Nov. 4, 2022 (KR) ........................ 10-2022-0145716

(51) Int. Cl.
*B60W 20/13* (2016.01)
*B60L 7/18* (2006.01)
(Continued)

(52) U.S. Cl.
CPC ............... *B60W 20/13* (2016.01); *B60L 7/18* (2013.01); *B60L 15/20* (2013.01); *B60W 10/06* (2013.01);
(Continued)

(58) Field of Classification Search
CPC . B62D 12/02; B60L 7/26; B60L 53/57; B60L 58/15; B60L 50/62; B60L 2200/28; B60L 7/10; B60L 2240/443; B60L 7/18; B60L 15/20; B60L 50/61; B60L 2240/14; B60L 2240/423; B60L 2240/54; B60L 2260/20; B60L 2260/24; B60W 10/26; B60W 20/15; B60W 30/18127; B60W 30/182; B60W 40/107; B60W 50/10;
(Continued)

(56) References Cited

U.S. PATENT DOCUMENTS 9,857,255 B2 * 1/2018 Hagan ..................... B60L 58/20
2009/0308670 A1 * 12/2009 Shepard, Jr. ............ B60L 15/32
180/65.21

(Continued)

*Primary Examiner* — Abdalla A Khaled
(74) *Attorney, Agent, or Firm* — MORGAN, LEWIS & BOCKIUS LLP

(57) ABSTRACT

A method of controlling a towing mode of an eco-friendly vehicle, may easily charge a battery of a towed vehicle by selecting one of a charge mode during traveling, a regenerative braking charge mode, and a coasting charge mode for charging the battery of the towed vehicle when a towing vehicle tows the towed vehicle so that a motor of the towed vehicle is driven by a negative charge torque for charging the battery when the towing vehicle accelerates or decelerates, and furthermore, may easily perform the assist of the traveling driving force of the towing vehicle by selecting a discharge mode during traveling in a state in which the towed vehicle does not need to be charged to the amount of charge of the battery of the towed vehicle greater than or equal to a reference value so that the motor of the towed vehicle is driven by a positive driving torque by discharging the battery of the towed vehicle.

20 Claims, 8 Drawing Sheets

(51) Int. Cl.

| | |
|---|---|
| ***B60L 15/20*** | (2006.01) |
| ***B60W 10/06*** | (2006.01) |
| ***B60W 10/08*** | (2006.01) |
| *B60L 50/61* | (2019.01) |

(52) U.S. Cl.
CPC .............. *B60W 10/08* (2013.01); *B60L 50/61* (2019.02); *B60L 2240/14* (2013.01); *B60L 2240/423* (2013.01); *B60L 2240/54* (2013.01); *B60L 2260/20* (2013.01); *B60L 2260/24* (2013.01); *B60W 2510/0657* (2013.01); *B60W 2510/083* (2013.01); *B60W 2510/244* (2013.01)

(58) Field of Classification Search
CPC ..... B60W 2510/101; B60W 2520/105; B60W 20/13; B60W 10/06; B60W 10/08; B60W 2510/0657; B60W 2510/083; B60W 2510/244; B60Y 2200/91; B60Y 2200/92; B60Y 2300/28; Y02T 10/70; Y02T 10/7072; Y02T 90/40

See application file for complete search history.

(56) References Cited

U.S. PATENT DOCUMENTS

| | | | | |
|---|---|---|---|---|
| 2013/0257145 | A1* | 10/2013 | Caldeira | B60L 50/61 307/9.1 |
| 2014/0188318 | A1* | 7/2014 | Langgood | G06F 17/00 701/22 |
| 2018/0086227 | A1* | 3/2018 | Healy | B60L 15/2018 |
| 2018/0186377 | A1* | 7/2018 | Bramson | B60L 50/61 |
| 2019/0009760 | A1* | 1/2019 | Zenner | B60T 8/323 |
| 2019/0123578 | A1* | 4/2019 | Zenner | H02J 7/70 |
| 2019/0164427 | A1* | 5/2019 | Greenwood | G08G 1/14 |
| 2020/0164890 | A1* | 5/2020 | Shin | B60K 6/48 |
| 2020/0231045 | A1* | 7/2020 | Shin | B60L 15/2045 |
| 2021/0197673 | A1* | 7/2021 | Espig | B60L 53/53 |
| 2022/0324433 | A1* | 10/2022 | Salter | B60W 30/18172 |
| 2022/0388484 | A1* | 12/2022 | Salter | B60T 17/22 |
| 2023/0042880 | A1* | 2/2023 | Baumbick | B60L 53/16 |
| 2023/0096878 | A1* | 3/2023 | Thomason | B60L 53/16 320/109 |
| 2023/0246471 | A1* | 8/2023 | Salter | B60L 53/67 320/109 |
| 2023/0373315 | A1* | 11/2023 | Salter | B60W 20/00 |
| 2024/0025264 | A1* | 1/2024 | Treharne | B60L 50/60 |
| 2024/0025294 | A1* | 1/2024 | Treharne | B60L 3/003 |
| 2024/0025383 | A1* | 1/2024 | Treharne | B60T 8/323 |

* cited by examiner

METHOD OF CONTROLLING TOWING MODE OF ECO-FRIENDLY VEHICLE

CROSS-REFERENCE TO RELATED APPLICATION

The present application claims priority to Korean Patent Application No. 10-2022-0145716 filed on Nov. 4, 2022, the entire contents of which is incorporated herein for all purposes by this reference.

BACKGROUND OF THE PRESENT DISCLOSURE

Field of the Present Disclosure

The present disclosure relates to a method of controlling a towing mode of an eco-friendly vehicle, and more specifically, to a method of controlling a towing mode of an eco-friendly vehicle capable of easily charging or discharging a battery of a towed vehicle when a towing vehicle tows the towed vehicle to a destination.

Description of Related Art

As is well known, eco-friendly vehicles include hybrid electric vehicles using an engine and a motor as a driving source, electric vehicles using a motor as a traveling driving source, a fuel cell vehicle, and the like.

When owners who own two or more types of eco-friendly vehicles according to the purpose of use need to use all of two or more types of vehicles at a desired destination, the owners may take all of two or more types of vehicles to the desired destination using a neutral towing function.

For example, by defining one vehicle as a towing vehicle that actually travels and defining the other vehicle as a towed vehicle connected to the rear of the towing vehicle by a predetermined towing device, the owners may take all of two or more types of vehicles to the desired destination.

The neutral towing function refers to a function of setting a transmission stage of the towed vehicle towed by the towing vehicle to neutral so that the towed vehicle may be maintained in an unloaded state and easily towed.

However, there is a problem in that even when a battery of the towed vehicle which is an eco-friendly vehicle needs to be charged, as the towed vehicle is towed to the desired destination in the unloaded state, the towed vehicle may not be used immediately at the desired destination.

Therefore, there is a demand for a battery charge control method of the towed vehicle when the towing vehicle travels in a state of towing the towed vehicle to improve the merchantability of the eco-friendly vehicles and expect additional benefits thereof.

Furthermore, there is a demand for a battery discharge control method of driving a motor of the towed vehicle so that the assist of the traveling driving force of the towed vehicle is performed when the amount of charge of the battery of the towed vehicle is a certain level or more.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling a towing mode of an eco-friendly vehicle configured for easily charging a battery of a towed vehicle by selecting one of a charge mode during traveling, a regenerative braking charge mode, and a coasting charge mode for charging the battery of the towed vehicle when a towing vehicle which is a hybrid electric vehicle among eco-friendly vehicles tows the towed vehicle which is an electric vehicle or a hybrid electric vehicle so that a motor of the towed vehicle is driven by a negative charge torque for charging the battery when the towing vehicle accelerates or brakes.

Furthermore, the present disclosure is directed to providing a method of controlling a towing mode of an eco-friendly vehicle configured for easily performing the assist of the traveling driving force of a towing vehicle by selecting a discharge mode during traveling when the assist of the traveling driving force of the towing vehicle is required in a state in which the towed vehicle does not need to be charged to the amount of charge of the battery greater than or equal to a reference value when the towing vehicle which is a hybrid electric vehicle among eco-friendly vehicles tows the towed vehicle which is an electric vehicle or a hybrid electric vehicle so that a motor of the towed vehicle is driven by a positive driving torque by discharging the battery of the towed vehicle.

To achieve the objects, the present disclosure provides a method of controlling a towing mode of an eco-friendly vehicle including setting a towing mode between a towing vehicle and a towed vehicle, determining whether a second battery of the towed vehicle needs to be charged, executing different charge modes according to traveling conditions of the towing vehicle, determining whether an assist of a traveling driving force by driving of a second motor of the towed vehicle is required when the second battery does not need to be charged, and executing a discharge mode during traveling in which the assist of the traveling driving force by the driving of the second motor of the towed vehicle is performed when the assist of the traveling driving force is required.

Furthermore, the method may further include determining whether to satisfy a traveling driving force assist entry condition before the discharge mode during traveling is executed, wherein the discharge mode during traveling may be executed when the traveling driving force assist entry condition is satisfied.

Furthermore, the method may include performing neutral control for a driving system of the towed vehicle when it is determined that the assist of the traveling driving force by the driving of the second motor of the towed vehicle is not required.

In the executing of the different charge modes according to the traveling conditions of the towing vehicle, one of a charge mode during traveling according to acceleration, a regenerative braking charge mode according to braking, and a coasting charge mode according to deceleration may be executed.

The charge mode during traveling may include determining a driver demand torque, determining an allowable charge torque of a second motor of the towed vehicle for charging the second battery of the towed vehicle, determining that a chargeable torque of the second motor for charging the second battery of the towed vehicle is in a range within the allowable charge torque, and driving the second motor by the chargeable torque to charge the second battery and at the same time, driving an engine and a first motor by a distribution torque satisfying the driver demand torque.

The charge mode during traveling may further include determining whether the second battery of the towed vehicle is chargeable, wherein determining the chargeable torque of the second motor when the second battery is chargeable may be performed.

In the charge mode during traveling, the method may further include, before the engine and the first motor are driven, determining an engine compensation torque by subtracting the chargeable torque of the second motor from the allowable charge torque of the second motor and re-determining that an engine torque is a level reduced by the engine compensation torque.

In the charge mode during traveling, as the engine torque is re-determined, the sum of the chargeable torque of the second motor, the re-determined engine torque, and a first motor torque may be determined to be a level satisfying the driver demand torque.

The discharge mode during traveling may include determining a driver demand torque, determining an allowable discharge torque of the second motor for the assist of the traveling driving force, determining that a dischargeable torque of the second motor for the assist of the traveling driving force is in the range within the allowable discharge torque, and driving the second motor by the dischargeable torque for the assist of the traveling driving force and at the same time, driving an engine and a first motor by a distribution torque satisfying the driver demand torque.

The discharge mode during traveling may further include determining whether the second battery of the towed vehicle is dischargeable, wherein determining the dischargeable torque of the second motor when the second battery is dischargeable may be performed.

In the discharge mode during traveling, the method may further include, before the engine and the first motor are driven, determining a first motor compensation torque by subtracting the dischargeable torque of the second motor from the allowable discharge torque of the second motor and re-determining that the first motor torque is a level reduced by the first motor compensation torque.

In the discharge mode during traveling, as the first motor torque is re-determined, the sum of the dischargeable torque of the second motor, an engine torque, and the re-determined first motor torque may be determined to be a level satisfying the driver demand torque.

The regenerative braking charge mode may include determining a braking demand torque, determining an allowable charge torque of a second motor of the towed vehicle for charging the second battery of the towed vehicle, determining that a chargeable torque of the second motor for charging the second battery of the towed vehicle is in the range within the allowable charge torque, and driving the second motor by the chargeable torque to charge the second battery and at the same time, driving a first motor and a hydraulic braking device by a distribution torque satisfying the braking demand torque.

The regenerative braking charge mode may further include determining whether the second battery of the towed vehicle is chargeable, wherein determining the chargeable torque of the second motor when the second battery is chargeable may be performed.

In the regenerative braking charge mode, the method may further include, before the first motor and the hydraulic braking device are driven, determining the charge compensation torque of the first motor by subtracting the chargeable torque of the second motor from the allowable charge torque of the second motor and re-determining that the first motor torque is a level increased by the charge compensation torque.

In the regenerative braking charge mode, as the first motor torque is re-determined, the sum of the chargeable torque of the second motor, a hydraulic braking torque, and the re-determined first motor torque may be determined to be a level satisfying the braking demand torque.

The coasting charge mode may include determining a coasting demand torque, determining an allowable charge torque of a second motor of the towed vehicle for charging the second battery of the towed vehicle, determining that a chargeable torque of the second motor for charging the second battery of the towed vehicle is in the range within the allowable charge torque, and driving the second motor by the chargeable torque to charge the second battery and at the same time, driving a first motor by a distribution torque satisfying a coasting demand torque.

The coasting charge mode may further include determining whether the second battery of the towed vehicle is chargeable, wherein determining the chargeable torque of the second motor when the second battery is chargeable may be performed.

In the coasting charge mode, the method may further include, before the first motor is driven, determining the charge compensation torque of the first motor by subtracting the chargeable torque of the second motor from the allowable charge torque of the second motor and re-determining that the first motor torque is a level increased by the charge compensation torque.

In the coasting charge mode, as the first motor torque is re-determined, the sum of the chargeable torque of the second motor and the re-determined first motor torque may be determined to be a level satisfying the coasting demand torque.

Meanwhile, after checking whether power electric (PE) parts of the towing vehicle and the towed vehicle are in a normal state, determining whether the second battery of the towed vehicle needs to be charged may be performed when the PE parts are in the normal state.

Through the above configuration, the present disclosure provides the following effects.

First, it is possible to easily charge the battery of the towed vehicle by selecting one of the charge mode during traveling, the regenerative braking charge mode, and the coasting charge mode for charging the battery of the towed vehicle when the towing vehicle which is the hybrid electric vehicle among the eco-friendly vehicles tows the towed vehicle which is the electric vehicle or the hybrid electric vehicle so that the motor of the towed vehicle is driven by the negative charge torque for charging the battery when the towing vehicle accelerates or brakes.

Second, by charging the battery of the towed vehicle when the towing vehicle which is the hybrid electric vehicle among the eco-friendly vehicles tows the towed vehicle which is the electric vehicle or the hybrid electric vehicle, it is possible to improve the merchantability and convenience of the eco-friendly vehicle, such as using immediately the towed vehicle upon reaching the desired destination.

Third, by implementing the sense of braking pulling the towing vehicle in a direction opposite to traveling as the motor of the towed vehicle is driven by a negative torque for charging the battery while the towing vehicle decelerates, it is possible to additionally secure braking stability while the towing vehicle travels.

Fourth, it is possible to easily perform the assist of the traveling driving force of the towing vehicle by driving the motor of the towed vehicle by the positive driving torque by discharging the battery of the towed vehicle when the assist of the traveling driving force of the towing vehicle is required in the state in which the towed vehicle does not need to be charged to the amount of charge of the battery of the towed vehicle greater than or equal to the reference value.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

BRIEF DESCRIPTION OF THE DRAWINGS

The above and other features of the present disclosure will now be described in detail with reference to certain exemplary examples thereof illustrated in of illustration only, and thus are not limitative of the present disclosure, and wherein.

Figure 1:
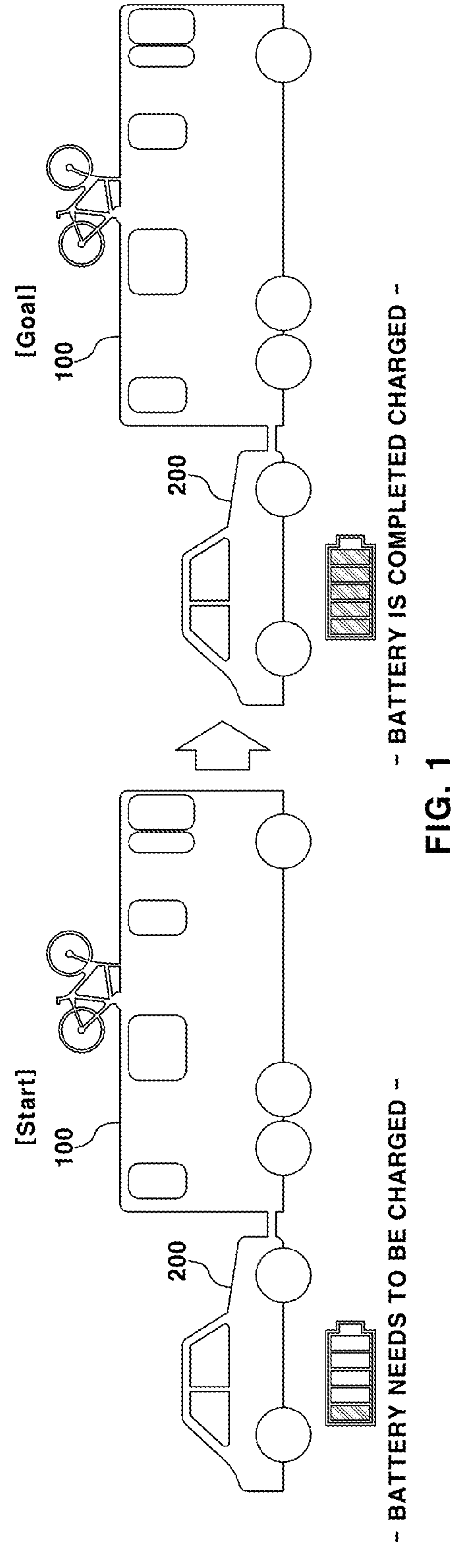
FIG. 1 is a schematic diagram showing the concept of a method of controlling a towing mode of an eco-friendly vehicle according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, exemplary embodiments of the present disclosure will be described in detail with reference to the accompanying drawings.

FIG. 1 is a schematic diagram showing the concept of a method of controlling a towing mode of an eco-friendly vehicle according to an exemplary embodiment of the present disclosure, and reference numeral 100 indicates a towing vehicle which is a hybrid electric vehicle, and reference numeral 200 indicates a towed vehicle which is an eco-friendly vehicle such as a hybrid electric vehicle or an electric vehicle.

As shown in FIG. 1, the main point of the method of controlling the towing mode according to an exemplary embodiment of the present disclosure is to easily charge a battery of the towed vehicle 200 when the battery of the towed vehicle 200 needs to be charged when the towing vehicle 100 which is a hybrid electric vehicle tows the towed vehicle 200 which is a hybrid electric vehicle or an electric vehicle to a desired destination.

Figure 2:
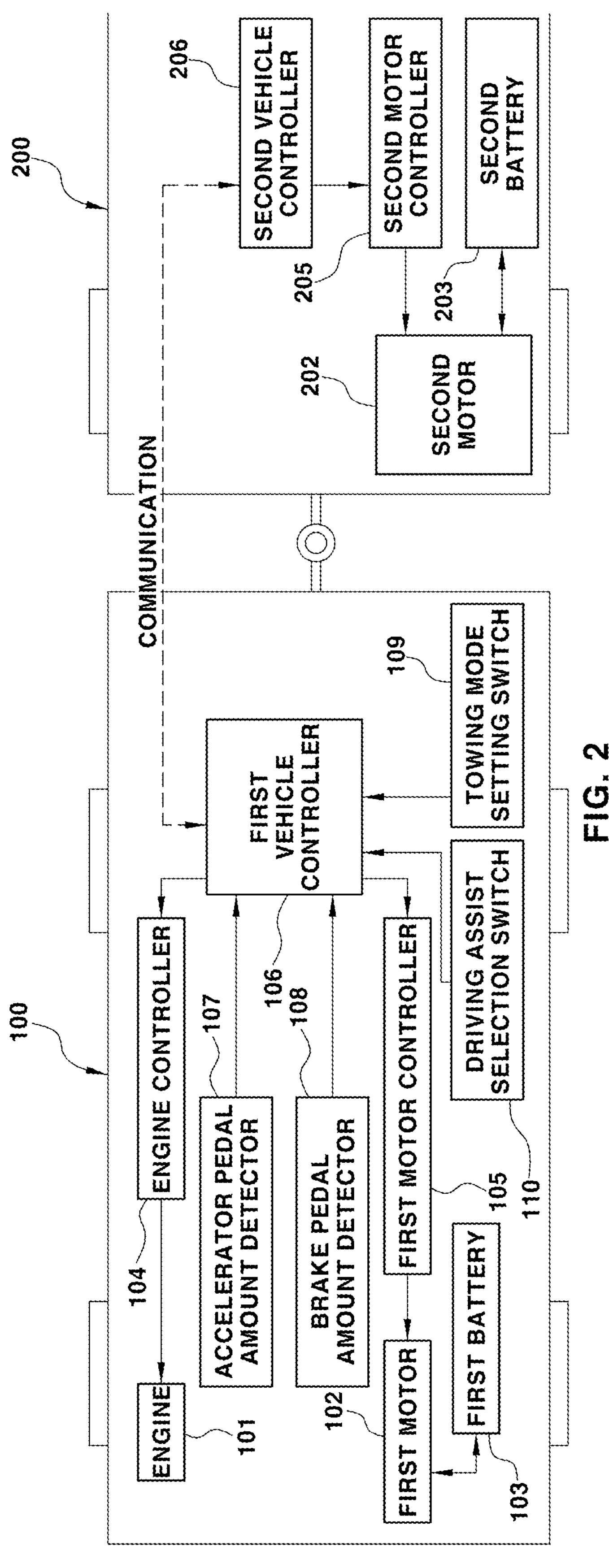
FIG. 2 is a control schematic diagram for implementing the method of controlling the towing mode of the eco-friendly vehicle according to an exemplary embodiment of the present disclosure.
Figure 3:
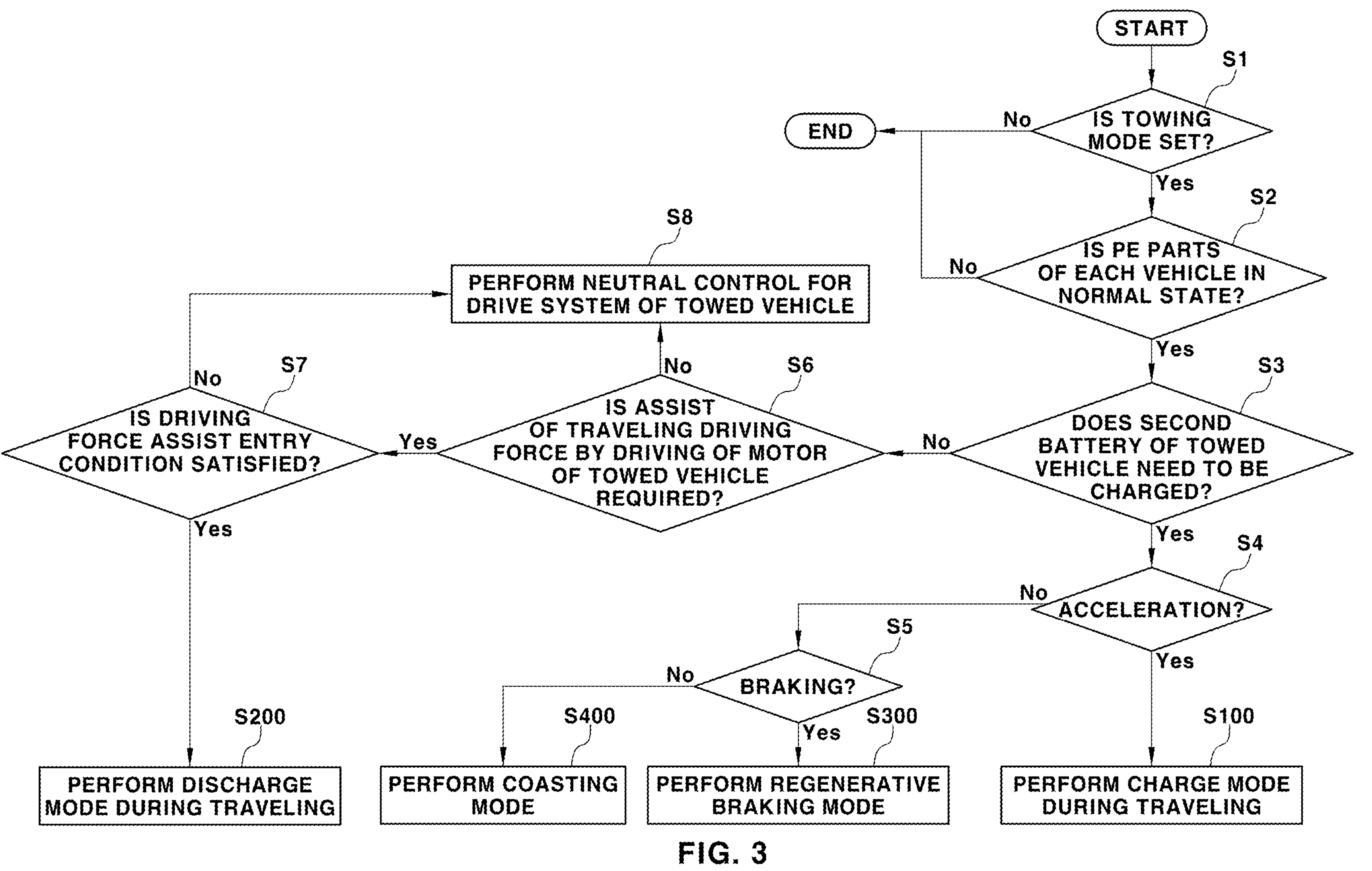
FIG. 3 is a flowchart showing the method of controlling the towing mode of the eco-friendly vehicle according to an exemplary embodiment of the present disclosure.

FIG. 2 is a schematic diagram for the method of controlling the towing mode of the eco-friendly vehicle according to an exemplary embodiment of the present disclosure.

As shown in FIGS. 2, the hybrid electric vehicle which is the towing vehicle 100 is provided with an engine 101 and a first motor 102 for traveling, and the first motor 102 is connected to a first battery 103 to be charged and discharged.

Furthermore, the towing vehicle 100 includes an engine controller 104 for controlling the engine 101, a first motor controller 105 for controlling the first motor 102, a first vehicle controller 106 for instructing an engine driving torque and a motor driving torque to the engine controller 104 and the first motor controller 105, respectively, as an upper controller, and the like.

In the instant case, the first vehicle controller 106 is configured to determine whether the towing vehicle accelerates or decelerates based on detection signals transmitted from an accelerator pedal amount detector 107 and a brake pedal amount detector 108 and instructs the engine driving torque and the motor driving torque to the engine controller 104 and the first motor controller 105, respectively.

The accelerator pedal amount detector 107 may be an accelerator pedal position sensor (APS), and the brake pedal amount detector 108 may be a brake pedal position sensor (BPS).

The hybrid electric vehicle or the electric vehicle which is the towed vehicle 200 is provided with a second motor 202 and a second battery 203 for traveling and also includes a second motor controller 205 for controlling the second motor 202 and a second vehicle controller 206 for instructing the motor driving torque to the second motor controller 205 as an upper controller.

Furthermore, the towing vehicle 100 includes a towing mode setting switch 109, and the first vehicle controller 106 of the towing vehicle 100 may be connected to the second vehicle controller 206 of the towed vehicle 200 to exchange a signal through a general wireless communication device by a switching signal of the towing mode setting switch 109.

For example, because a wireless communication module is embedded in the first vehicle controller 106 and the second vehicle controller 206, the first vehicle controller 106 and the second vehicle controller 206 may be connected to exchange the signal through the wireless communication module by the switching signal of the towing mode setting switch 109.

Here, the method of controlling the towing mode of the eco-friendly vehicle based on the above configuration will be described in detail.

First, whether the towing mode between the towing vehicle 100 which is a hybrid electric vehicle and the towed vehicle 200 which is a hybrid electric vehicle or an electric vehicle is checked (S1).

To the present end, whether a communication state between the towing vehicle 100 and the towed vehicle 200 is good is checked in a state in which the towed vehicle 200 which is a hybrid electric vehicle or an electric vehicle is connected to the towing vehicle 100 which is a hybrid electric vehicle to be towed.

For example, the first vehicle controller 106 of the towing vehicle 100 may be connected to the second vehicle controller 206 of the towed vehicle 200 to exchange the signal through the general wireless communication device by the switching signal of the towing mode setting switch 109 by a driver's operation, and thus the driver who gets on the towing vehicle 100 may check whether the communication state between the first vehicle controller 106 of the towing vehicle 100 and the second vehicle controller 206 of the towed vehicle 200 is a state of being connected to transmit the control signal using a predetermined menu displayed on an in-vehicle display.

Subsequently, when the first vehicle controller 106 of the towing vehicle 100 and the second vehicle controller 206 of the towed vehicle 200 are in a state of being communicatively connected, whether various power electric (PE) parts of the towing vehicle 100 and the towed vehicle 200 are in a normal state is checked (S2).

For example, the first vehicle controller 106 of the towing vehicle 100 may check that the PE part, such as the first motor 102 of the towing vehicle 100, is in a normal state other than a fault, and furthermore, the first vehicle controller 106 of the towing vehicle 100 may check that the PE part, such as the second motor 202 of the towed vehicle, is in a normal state other than a fault through communication with the second vehicle controller 206 of the towed vehicle 200.

Subsequently, when various PE parts of the towing vehicle 100 and the towed vehicle 200 are in the normal state, it is determined whether the second battery 203 of the towed vehicle 200 needs to be charged (S3).

For example, the first vehicle controller 106 of the towing vehicle 100 receives a state of charge (SOC), which is information on the amount of charge of the second battery 203, from the second vehicle controller 206 of the towed vehicle 200 and is configured to determine that the second battery 203 of the towed vehicle 200 needs to be charged when the received amount of charge of the second battery 203 is smaller than a predetermined reference value.

Therefore, when it is determined that the second battery needs to be charged, different charge modes may be executed according to traveling conditions, such as acceleration, braking, and deceleration of the towing vehicle.

In other words, when it is determined that the second battery 203 needs to be charged, any one of a charge mode during traveling according to acceleration, a regenerative braking charge mode according to braking, and a coasting charge mode according to deceleration may be executed.

For example, the first vehicle controller 106 of the towing vehicle 100 is configured to determine whether the towing vehicle is in an acceleration state based on the detection signal transmitted from the accelerator pedal amount detector 107 (S4) and executes the charge mode during traveling (S100) as described below for charging the second battery 203 of the towed vehicle 200 when it is determined that the towing vehicle 100 is in the acceleration state.

On the other hand, the first vehicle controller 106 of the towing vehicle 100 is configured to determine whether the towing vehicle is in a braking state based on the detection signal transmitted from the brake pedal amount detector 108 (S5) and executes the regenerative braking charge mode (S300) as described below for charging the second battery 203 of the towed vehicle 200 when it is determined that the towing vehicle 100 is in the braking state.

Furthermore, when the towing vehicle 100 is neither in the acceleration state nor in the braking state, that is, in a state in which the driver has released the accelerator pedal and the brake pedal, the vehicle is in a coasting traveling state, and thus the coasting charge mode as described below is executed to charge the second battery 203 of the towed vehicle 200 (S400).

Meanwhile, as the determination result in the operation (S2), when the amount of charge of the second battery 203 of the towed vehicle 200 received from the first vehicle controller 106 of the towing vehicle 100 is greater than or equal to the predetermined reference value, it is determined that the second battery 203 of the towed vehicle 200 does not need to be charged.

At the present time, when the amount of charge of the second battery 203 of the towed vehicle 200 is greater than or equal to the predetermined reference value, the driver of the towing vehicle 100 may perform the assist of the traveling driving force by the driving of the second motor 202 of the towed vehicle 200 to increase the traveling driving force of the towing vehicle.

To the present end, the first vehicle controller 106 of the towing vehicle 100 may be configured to determine whether the assist of the traveling driving force by the driving of the second motor of the towed vehicle is required (S6).

For example, when the first vehicle controller 106 of the towing vehicle 100 displays through the display in the towing vehicle 100 that the assist of the traveling driving force by the driving of the second motor of the towed vehicle is possible, the first vehicle controller 106 of the towing vehicle 100 may be configured to determine that the assist of the traveling driving force by the driving of the second motor of the towed vehicle is required when a driving assist selection switch 110 is operated according to the driver's intention.

After it is determined that the assist of the traveling driving force by the driving of the second motor 202 of the towed vehicle 200 is required, the first vehicle controller 106 of the towing vehicle 100 may further perform an operation of determining whether a driving force assist entry condition is satisfied (S7).

For example, when a gradient state of a road during traveling is a downhill road, the vehicle is in a turning traveling state, a vehicle speed is in a high speed state which is a predetermined level or higher, or the amount of depressing the accelerator pedal is a predetermined amount or more, it is determined that the driving force assist entry condition is not satisfied for the traveling safety of the vehicle, and on the other hand, when the road is flat during traveling, the vehicle is in a straight traveling state, the vehicle speed is lower than the predetermined level, and the amount of depressing the accelerator pedal is smaller than the predetermined amount, it is determined that the driving force assist entry condition is satisfied.

Therefore, when it is determined that the assist of the traveling driving force by the driving of the second motor of the towed vehicle is required and the driving force assist entry condition is satisfied, the discharge mode during traveling (S200) as described below is executed so that the assist of the traveling driving force by the driving of the second motor of the towed vehicle is performed.

Meanwhile, as the determination result in the operation (S6), when it is determined that the assist of the traveling driving force by the driving of the second motor of the towed vehicle is not required, neutral control may be performed for a powertrain, that is, a driving system of the towed vehicle (S8).

For example, a signal notifying that the assist of the traveling driving force by the driving of the second motor of the towed vehicle is not required is transmitted from the first vehicle controller of the towing vehicle 100 to the second vehicle controller 206 of the towed vehicle 200, a torque of the second motor is controlled to zero by the second vehicle controller 206 of the towed vehicle 200 or the neutral control of the driving system, such as controlling a driving shaft clutch to be open, may be performed.

Here, a process of executing the charge mode during traveling will be described in detail as follows.

Figure 4:
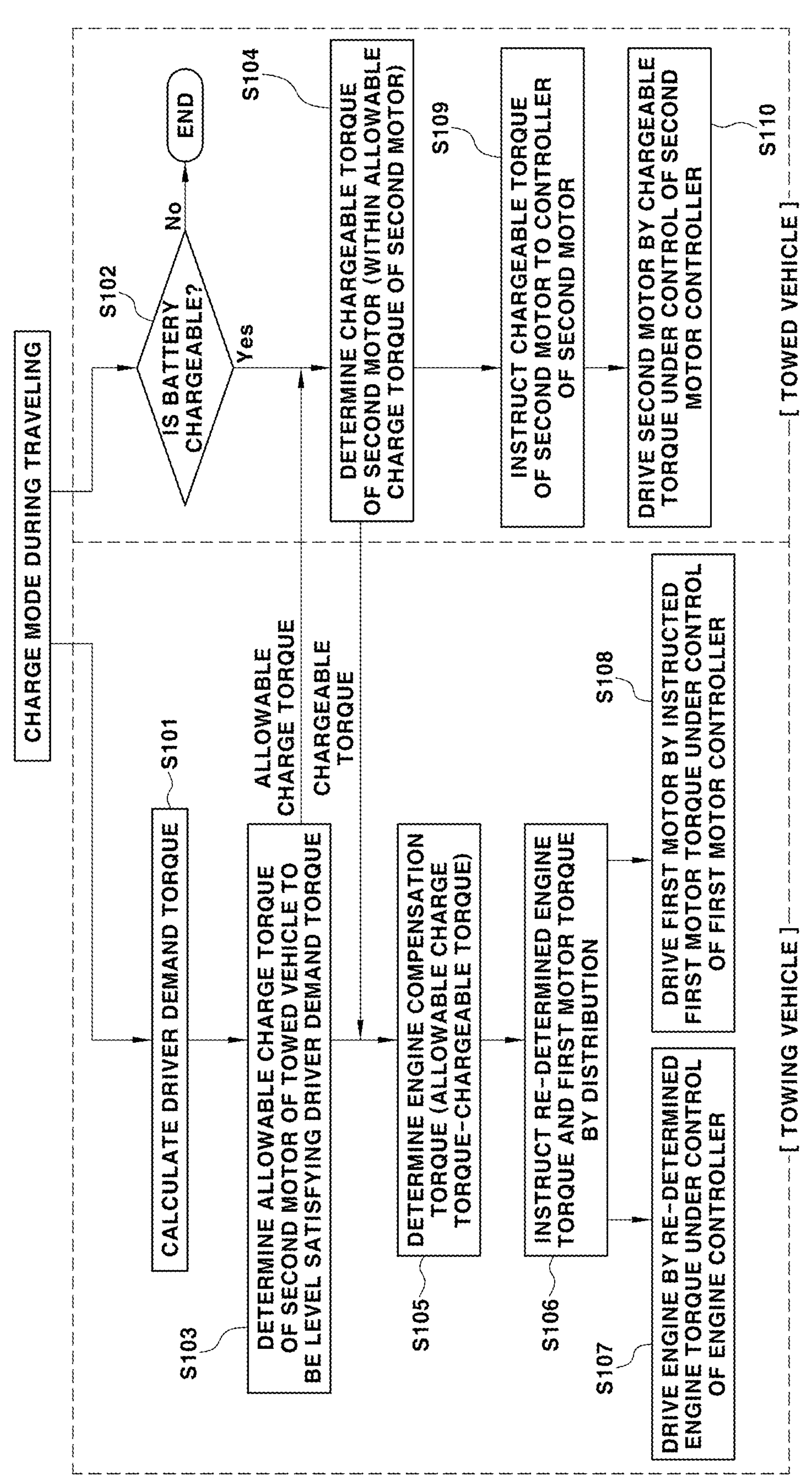
FIG. 4 is a flowchart showing a charge mode during traveling in the method of controlling the towing mode of the eco-friendly vehicle according to an exemplary embodiment of the present disclosure.

FIG. 4 is a flowchart showing a charge mode during traveling in the method of controlling the towing mode of the eco-friendly vehicle according to an exemplary embodiment of the present disclosure.

As described above, when the first vehicle controller 106 of the towing vehicle 100 determines that the towing vehicle is in the acceleration state based on the detection signal transmitted from the accelerator pedal amount detector 107, the charge mode during traveling (S100) is executed to charge the second battery 203 of the towed vehicle 200.

To the present end, an operation of determining a driver demand torque is first performed (S101).

For example, the operation of determining the driver demand torque may include an operation of detecting, by the accelerator pedal amount detector 107, the amount of depressing the accelerator pedal when the driver depresses the accelerator pedal and transmitting the detected amount of depressing the accelerator pedal to the first vehicle controller 106 of the towing vehicle 100 and an operation of determining, by the first vehicle controller 106 of the towing vehicle 100, the driver demand torque by a predetermined logic based on a detection signal of the amount of depressing the accelerator pedal, which is transmitted from the accelerator pedal amount detector 107.

In the instant case, the second vehicle controller 206 of the towed vehicle 200 is configured to determine whether the second battery 203 of the towed vehicle is chargeable (S102).

For example, when the second battery 203 of the towed vehicle 200 is in a high-temperature state which is a critical temperature or higher or fails, battery charge limit power, that is, battery chargeable power may be zero, and thus it is determined that the second battery 203 of the towed vehicle 200 is in a chargeable state when the battery chargeable power is greater than zero.

Subsequently, the first vehicle controller 106 of the towing vehicle 100 is configured to determine that an allowable charge torque of the second motor 202 for charging the second battery 203 of the towed vehicle 200 is a level satisfying the driver demand torque (S103).

The allowable charge torque of the second motor 202 refers to a torque which is determined by distribution so that the second battery 203 of the towed vehicle may be easily charged when the towing vehicle accelerates while satisfying the driver demand torque.

For example, assuming that the driver demand torque is 100 kgf·m, to satisfy the driver demand torque of 100 kgf·m, the first vehicle controller 106 may determine, by distribution, that the engine torque is 150 kgf·m, the first motor torque is −30 kgf·m which is a negative torque value to charge the first battery 103, and the allowable charge torque of the second motor 202 is −20 kgf·m which is a negative torque value to charge the second battery 203.

It may be noted that the above torque values are only one example for the clear description and better understanding of the present disclosure and are not limited to the exemplary values.

Therefore, even when the first motor 102 is driven by −30 kgf·m which is a negative torque value and the second motor 202 is also driven by −20 kgf·m which is a negative torque value, the engine 101 may be driven by 150 kgf·m for the traveling of the towing vehicle, satisfying the driver demand torque of 100 kgf·m.

Alternatively, assuming that the driver demand torque is 100 kgf·m, to satisfy the driver demand torque of 100 kgf·m, the first vehicle controller 106 may be configured to determine that the engine torque is 100 kgf·m, the first motor torque is 20 kgf·m which is a positive torque value for traveling driving, and the allowable charge torque of the second motor 202 is −20 kgf·m which is a negative torque value to charge the second battery 203.

Therefore, even when the second motor 202 is driven by −20 kgf·m which is a negative torque value, the engine 101 may be driven by 100 kgf·m and the first motor 102 may also be driven by 20 kgf·m which is a positive torque value for the traveling of the towing vehicle, satisfying the driver demand torque of 100 kgf·m.

At the present time, the first vehicle controller 106 of the towing vehicle 100 transmits the allowable charge torque of the second motor 202 of the towed vehicle 200 determined as described above to the second vehicle controller 206 of the towed vehicle 200 through communication.

Subsequently, a chargeable torque of the second motor 202 for charging the second battery 203 of the towed vehicle 200 is determined (S104).

The chargeable torque of the second motor 202 is determined to be a level within the allowable charge torque of the second motor 202 according to a state of charge (SOC) state of the second battery 203.

For example, as the amount of charge required for the second battery 203 of the towed vehicle 200 increases, the chargeable torque of the second motor 202 may be determined to be a greater value in the range of the allowable charge torque, and as the amount of charge required for the second battery 203 of the towed vehicle 200 decreases, the chargeable torque of the second motor 202 may be determined to be a smaller value in the range of the allowable charge torque.

When the second vehicle controller 206 of the towed vehicle 200 determines the chargeable torque of the second motor 202, as the SOC value of the second battery 203 is smaller than a reference value at which charge is required and is a level approaching the reference value, the second vehicle controller 206 of the towed vehicle 200 may be configured to determine that the chargeable torque of the second motor 202 is a smaller value in the range of the allowable charge torque of the second motor 202, and on the other hand, as the SOC value of the second battery 203 is a level which is away from the reference value, this is in a state in which the amount of charge required for the second battery increases, and thus the second vehicle controller 206 of the towed vehicle 200 may be configured to determine that the chargeable torque of the second motor 202 is a greater value in the range of the allowable charge torque of the second motor 202 to charge the second battery rapidly and smoothly.

For example, when the allowable charge torque of the second motor 202 is determined to be −20 kgf·m which is a negative torque value as described above, the second vehicle controller 206 of the towed vehicle 200 may be configured to determine that the chargeable torque of the second motor 202 is −10 kgf·m smaller than −20 kgf·m.

At the present time, the second vehicle controller 206 of the towed vehicle 200 transmits the chargeable torque (e.g., −10 kgf·m) of the second motor 202 determined as described above to the first vehicle controller 106 of the towing vehicle 100 through communication.

Therefore, the second motor 202 may be driven by the chargeable torque to charge the second battery 203 and at the same time, the engine 101 and the first motor 102 may be driven by a distribution torque satisfying the driver demand torque.

Subsequently, an engine compensation torque is determined based on the chargeable torque of the second motor 202 (S105).

To the present end, the first vehicle controller 106 of the towing vehicle 100 is configured to determine the engine compensation torque based on the chargeable torque of the second motor 202 transmitted from the second vehicle controller 206 of the towed vehicle 200 and re-determines the engine torque for satisfying the driver demand torque by the determined engine compensation torque.

The engine compensation torque may be determined to be a value obtained by subtracting the chargeable torque of the second motor 202 from the allowable charge torque of the second motor 202.

For example, as described above, to satisfy the driver demand torque of 100 kgf·m, when the chargeable torque of the second motor 202 is determined to be −10 kgf·m which is a negative torque value after the engine torque is 150 kgf·m, the first motor torque is −30 kgf·m which is a negative torque value, and the allowable charge torque of the second motor 202 is −20 kgf·m which is a negative torque value, the engine compensation torque may be determined to be −10 kgf·m obtained by subtracting the chargeable torque of −10 kgf·m from the allowable charge torque of −20 kgf·m.

Therefore, the engine torque may be re-determined to be a level reduced by the engine compensation torque, and for example, the engine torque of 150 kgf·m which is a positive torque value may be re-determined to be 140 kgf·m which is reduced by the engine compensation torque of −10 kgf·m which is a negative torque value.

As a result, when summing the re-determined engine torque of 140 kgf·m, the first motor torque of −30 kgf·m, and the chargeable torque of the second motor 202 of −10 kgf·m, the driver demand torque of 100 kgf·m for the acceleration traveling of the vehicle may be satisfied.

Subsequently, the first vehicle controller 106 of the towing vehicle 100 instructs the engine torque re-determined as described above to the engine controller 104 and instructs the first motor torque to the first motor controller 105 (S106).

Therefore, the engine 101 may be driven by the re-determined and instructed engine torque under the control of the engine controller 104 (S107), and the first motor 102 may be driven by the instructed first motor torque under the control of the first motor controller (S108).

For example, even when the first motor 102 is driven by −30 kgf·m which is a negative torque value to charge the first battery 103 and the second motor 202 is also driven by −10 kgf·m which is a negative torque value for charging the second battery 203, the engine 101 is driven by the re-determined engine torque of 140 kgf·m for the traveling of the towing vehicle, and thus the acceleration traveling of the towing vehicle satisfying the driver demand torque of 100 kgf·m may be performed.

As the engine torque is re-determined as described above, the sum of the chargeable torque of the second motor, the re-determined engine torque, and the first motor torque may be determined to be a level satisfying the driver demand torque.

Furthermore, the battery of the towed vehicle may be charged while the towed vehicle accelerates as described above.

To the present end, after the chargeable torque of the second motor 202 is determined in the operation (S104), the second vehicle controller 206 of the towed vehicle instructs the chargeable torque to the second motor controller 205 (S109).

Therefore, the second motor 202 may be configured to generate power and may be driven by the chargeable torque under the control of the second motor controller 205 (S110), and thus the second battery 203 of the towed vehicle may be easily charged by the power-generation and driving of the second motor 202 even during the acceleration traveling of the towing vehicle.

For example, the second motor 202 generates power and is driven by −10 kgf·m which is a negative torque value for charging the second battery as the chargeable torque, and thus the second battery 203 of the towed vehicle may be easily charged even during the acceleration traveling of the towing vehicle.

Here, a process of executing the discharge mode during traveling will be described in detail as follows.

Figure 5:
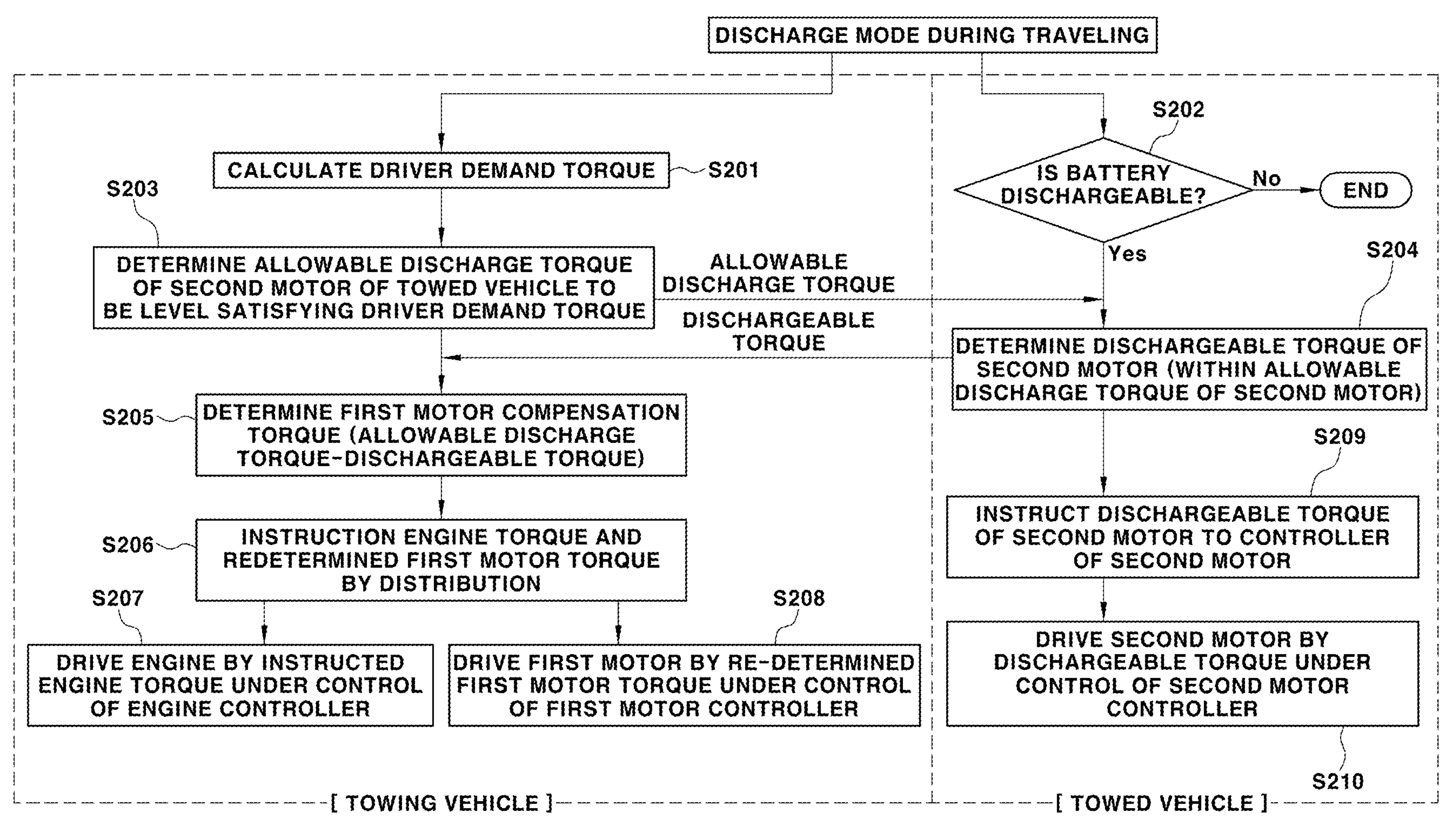
FIG. 5 is a flowchart showing a discharge mode during traveling in the method of controlling the towing mode of the eco-friendly vehicle according to an exemplary embodiment of the present disclosure.

FIG. 5 is a flowchart showing a discharge mode during traveling in the method of controlling the towing mode of the eco-friendly vehicle according to an exemplary embodiment of the present disclosure.

As described above, when it is determined that the assist of the traveling driving force by the driving of the second motor of the towed vehicle is required and the driving force assist entry condition is satisfied, the discharge mode during traveling (S200) in which the assist of the traveling driving force by the driving of the second motor of the towed vehicle is performed is executed.

To the present end, an operation of determining a driver demand torque is first performed (S201).

For example, the operation of determining the driver demand torque may include an operation of detecting, by the accelerator pedal amount detector 107, the amount of depressing the accelerator pedal when the driver depresses the accelerator pedal and transmitting the detected amount of depressing the accelerator pedal to the first vehicle controller 106 of the towing vehicle 100 and an operation of determining, by the first vehicle controller 106 of the towing vehicle 100, the driver demand torque by a predetermined logic based on the detection signal of the amount of depressing the accelerator pedal transmitted from the accelerator pedal amount detector 107.

In the instant case, the second vehicle controller 206 of the towed vehicle 200 is configured to determine whether the second battery 203 of the towed vehicle is dischargeable (S202).

For example, when the second battery 203 of the towed vehicle 200 is in a high-temperature state which is a critical temperature or higher or fails, battery discharge limit power, that is, battery dischargeable power may be zero, and thus when the battery dischargeable power is greater than zero, it is determined that the second battery 203 of the towed vehicle 200 is in a dischargeable state.

Subsequently, the first vehicle controller 106 of the towing vehicle 100 is configured to determine that an allowable discharge torque of the second motor 202 of the towed vehicle 200 is a level satisfying the driver demand torque (S203).

The allowable discharge torque of the second motor 202 refers to a torque which is determined, by distribution, so that the second motor 202 is driven by the discharge of the second battery 203 for the assist of the traveling driving force of the towing vehicle.

For example, assuming that the driver demand torque is 100 kgf·m, to satisfy the driver demand torque of 100 kgf·m, the first vehicle controller 106 is configured to determine, by distribution, that the engine torque is 100 kgf·m, the first motor torque is −30 kgf·m which is a negative torque value to charge the first battery 103, and the allowable discharge torque is 30 kgf·m which is a positive torque value to assist the driving force.

It should be noted that the above torque values are only one example for the clear description and better understanding of the present disclosure and are not limited to the exemplary values.

Therefore, even when the first motor 102 is driven by −30 kgf·m which is a negative torque value to charge the first battery 103, the engine 101 may be driven by 100 kgf·m for the traveling of the towing vehicle and the second motor 202 may also be driven by 30 kgf·m which is a positive torque value to assist the traveling driving force, satisfying the driver demand torque of 100 kgf·m.

At the present time, the first vehicle controller 106 of the towing vehicle 100 transmits the allowable discharge torque of the second motor 202 of the towed vehicle 200 determined as described above to the second vehicle controller 206 of the towed vehicle 200 through communication.

Subsequently, the dischargeable torque of the second motor 202 of the towed vehicle 200 is determined (S204).

The dischargeable torque of the second motor 202 refers to a torque at which the second motor 202 may actually be driven according to the amount of discharge of the second battery 203 to assist the traveling driving force of the towing vehicle.

The dischargeable torque of the second motor 202 is determined to be a level within the allowable discharge torque of the second motor 202 according to the SOC state of the second battery 203.

For example, as the SOC value of the second battery 203 of the towed vehicle 200 increases, the dischargeable torque of the second motor 202 is determined to be a greater value in the range of the allowable discharge torque, and as the SOC value of the second battery 203 of the towed vehicle 200 decreases, the dischargeable torque of the second motor 202 may be determined to be a smaller value in the range of the allowable discharge torque.

When the second vehicle controller 206 of the towed vehicle 200 determines the dischargeable torque of the second motor 202, as the SOC value of the second battery 203 is the reference value or more and is a level approaching the reference value, the second vehicle controller 206 of the towed vehicle 200 may be configured to determine that the dischargeable torque of the second motor 202 is a smaller value in the range of the allowable discharge torque of the second motor 202, and on the other hand, as the SOC value of the second battery 203 is a level which is away from the reference value, the SOC value of the second battery is a high state, and thus the second vehicle controller 206 of the towed vehicle 200 may be configured to determine that the dischargeable torque of the second motor 202 is a greater value in the range of the allowable discharge torque of the second motor 202.

For example, when the allowable discharge torque of the second motor 202 is determined to be 30 kgf·m which is a positive torque value as described above, the second vehicle controller 206 of the towed vehicle 200 may be configured to determine that the dischargeable torque of the second motor 202 is 20 kgf·m smaller than 30 kgf·m.

At the present time, the second vehicle controller 206 of the towed vehicle 200 transmits the dischargeable torque (e.g., 20 kgf·m) of the second motor 202 determined as described above to the first vehicle controller 106 of the towing vehicle 100 through communication.

Therefore, the second motor 202 may be driven by the dischargeable torque to assist the traveling driving force and at the same time, the engine 101 and the first motor 102 may be driven by the distribution torque satisfying the driver demand torque.

Subsequently, a first motor compensation torque is determined based on the dischargeable torque of the second motor 202 (S205).

To the present end, the first vehicle controller 106 of the towing vehicle 100 is configured to determine the first motor compensation torque based on the dischargeable torque of the second motor 202 transmitted from the second vehicle controller 206 of the towed vehicle 200 and re-determines the first motor torque for satisfying the driver demand torque by the determined first motor compensation torque.

The first motor compensation torque may be determined to be a value obtained by subtracting the dischargeable torque of the second motor 202 from the allowable discharge torque of the second motor 202.

For example, as described above, to satisfy the driver demand torque of 100 kgf·m, when the chargeable torque of the second motor 202 is determined to be 20 kgf·m which is a positive torque value after the engine torque is determined to be 100 kgf·m, the first motor torque is determined to be −30 kgf·m which is a negative torque value, and the allowable discharge torque of the second motor 202 is determined to be 30 kgf·m which is a positive torque value, the first motor compensation torque may be determined to be 10 kgf·m obtained by subtracting the dischargeable torque of 20 kgf·m from the allowable discharge torque of 30 kgf·m.

Therefore, the first motor torque (regenerative braking torque) may be re-determined to be a level reduced by the first motor compensation torque, and for example, the first motor torque (regenerative braking torque) of −30 kgf·m which is a negative torque value may be re-determined to be −20 kgf·m reduced by the first motor compensation torque of 10 kgf·m.

As a result, when summing the engine torque of 100 kgf·m, the re-determined first motor torque of −20 kgf·m, and the dischargeable torque of the second motor 202 of 20 kgf·m, the driver demand torque of 100 kgf·m may be satisfied.

Subsequently, the first vehicle controller 106 of the towing vehicle 100 instructs the engine torque to the engine controller 104 and instructs the first motor torque re-determined as described above to the first motor controller 105 (S206).

Therefore, the engine 101 may be driven by the instructed engine torque under the control of the engine controller 104 (S207), and the first motor 102 may be driven by the re-determined and instructed first motor torque under the control of the first motor controller 105 (S208).

For example, even when the engine is driven by the engine torque of 100 kgf·m and the first motor 102 is driven by −20 kgf·m which is a negative torque value to charge the first battery 103, the second motor 202 is driven by 20 kgf·m which is a positive torque to assist the traveling driving force, and thus the assist of the traveling driving force of the towed vehicle satisfying the driver demand torque of 100 kgf·m may be performed.

As the first motor torque is re-determined as described above, the sum of the dischargeable torque of the second motor, the engine torque, and the re-determined first motor torque may be determined to be a level satisfying the driver demand torque.

To the present end, after the dischargeable torque of the second motor 202 is determined in the operation (S204), the second vehicle controller 206 of the towed vehicle instructs the dischargeable torque to the second motor controller 205 (S209).

Therefore, the second motor 202 may be driven by the dischargeable torque under the control of the second motor controller 205 (S210), and thus even when the first motor 102 is driven by a negative torque for charge while the towing vehicle travels, the traveling of the towing vehicle satisfying the driver demand torque may be performed by the traveling force assist driving of the second motor 202.

Furthermore, when the first motor 102 is driven by a regenerative braking torque which is a negative torque because the first battery 103 of the towing vehicle needs to be charged, the second motor 202 of the towed vehicle assists the traveling driving force, and thus the first battery may easily be charged and at the same time, the traveling satisfying the driver demand torque may easily be performed by the traveling force assist driving of the second motor 202.

Here, a process of executing a regenerative braking charge mode upon braking will be described in detail as follows.

Figure 6:
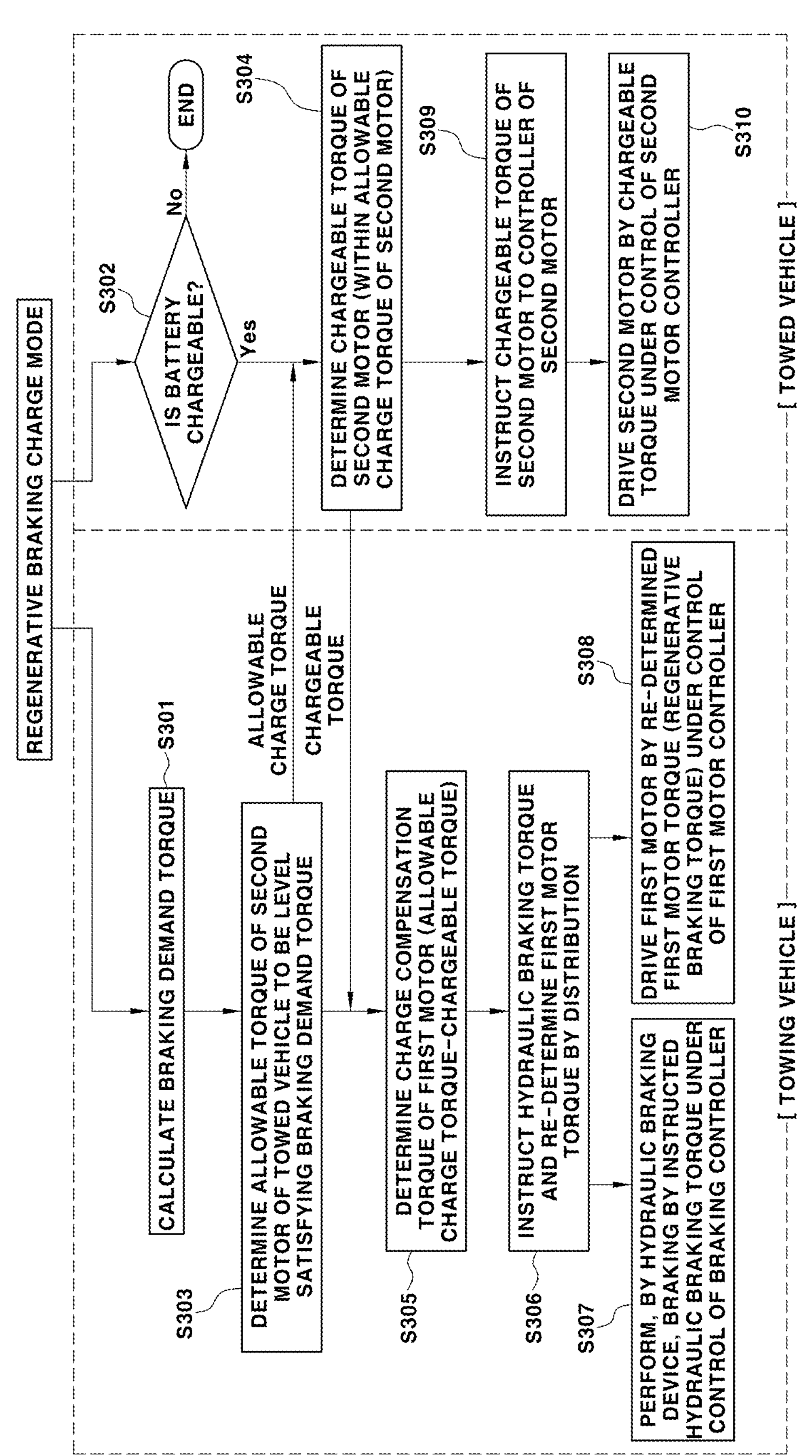
FIG. 6 is a flowchart showing a regenerative braking charge mode upon braking in the method of controlling the towing mode of the eco-friendly vehicle according to an exemplary embodiment of the present disclosure.

FIG. 6 is a flowchart showing a regenerative braking charge mode upon braking in the method of controlling the towing mode of the eco-friendly vehicle according to an exemplary embodiment of the present disclosure.

As described above, when the first vehicle controller 106 of the towing vehicle 100 determines that the towing vehicle is in a braking state based on the detection signal transmitted from the brake pedal amount detector 108, the regenerative braking charge mode upon braking (S300) is executed to charge the second battery 203 of the towed vehicle 200.

To the present end, an operation of determining a braking demand torque is first performed (S301).

For example, the operation of determining the braking demand torque may include an operation of detecting, by the brake pedal amount detector 108, the amount of depressing the brake pedal when the driver depresses the brake pedal and transmitting the detected amount of depressing the brake pedal to the first vehicle controller 106 of the towing vehicle 100 and an operation of determining, by the first vehicle controller 106 of the towing vehicle 100, the braking demand torque by a predetermined logic based on the detection signal of the amount of depressing the brake pedal transmitted from the brake pedal amount detector 108.

In the instant case, the second vehicle controller 206 of the towed vehicle 200 is configured to determine whether the second battery 203 of the towed vehicle is chargeable (S302).

For example, when the second battery 203 of the towed vehicle 200 is in a high-temperature state which is a critical temperature or higher or fails, battery charge limit power, that is, battery chargeable power may be zero, and thus it is determined that the second battery 203 of the towed vehicle 200 is in a chargeable state when the battery chargeable power is greater than zero.

Subsequently, the first vehicle controller 106 of the towing vehicle 100 is configured to determine that the allowable charge torque of the second motor 202 for charging the second battery 203 of the towed vehicle 200 is a level satisfying the braking demand torque (S303).

The allowable charge torque of the second motor 202 refers to a torque which is determined by distribution so that the second battery 203 of the towed vehicle may be easily charged when the towing vehicle decelerates while satisfying the braking demand torque.

For example, assuming that the braking demand torque is −100 kgf·m, to satisfy the braking demand torque of −100 kgf·m, the first vehicle controller 106 may determine, by distribution, that a hydraulic braking torque is −60 kgf·m, the first motor torque is −20 kgf·m which is a negative torque value for regenerative braking and charge of the first battery, and the allowable charge torque of the second motor 202 is −20 kgf·m which is a negative torque value for regenerative braking and charge of the second battery.

It may be noted that the above torque values are only one example for the clear description and better understanding of the present disclosure and are not limited to the exemplary values.

Therefore, a hydraulic braking device may provide the braking torque of −60 kgf·m, the first motor 102 may be driven by −20 kgf·m which is a negative torque value as a regenerative braking torque for charging the first battery, and the second motor 202 may also be driven by −20 kgf·m which is a negative torque value as a regenerative braking torque for charging the second battery, satisfying the braking demand torque of −100 kgf·m.

At the present time, the first vehicle controller 106 of the towing vehicle 100 transmits the allowable charge torque of the second motor 202 of the towed vehicle 200 determined as described above to the second vehicle controller 206 of the towed vehicle 200 through communication.

Subsequently, a chargeable torque of the second motor 202 for charging the second battery 203 of the towed vehicle 200 is determined (S304).

The chargeable torque of the second motor 202 is determined to be a level within the allowable charge torque of the second motor 202 according to the SOC state of the second battery 203.

For example, as the amount of charge required for the second battery 203 of the towed vehicle 200 increases, the chargeable torque of the second motor 202 may be determined to be a greater value in the range of the allowable charge torque, and as the amount of charge required for the second battery 203 of the towed vehicle 200 decreases, the chargeable torque of the second motor 202 may be determined to be a smaller value in the range of the allowable charge torque.

When the second vehicle controller 206 of the towed vehicle 200 determines the chargeable torque of the second motor 202, as the SOC value of the second battery 203 is smaller than the reference value at which charge is required and is a level approaching the reference value, the second vehicle controller 206 of the towed vehicle 200 may be configured to determine that the chargeable torque of the second motor 202 is a smaller value in the range of the allowable charge torque of the second motor 202, and on the other hand, as the SOC value of the second battery 203 is a level which is away from the reference value, this is in a state in which the amount of charge required for the second battery increases, and thus the second vehicle controller 206 of the towed vehicle 200 may be configured to determine that the chargeable torque of the second motor 202 is a greater value in the range of the allowable charge torque of the second motor 202 to charge the second battery rapidly and smoothly.

For example, when the allowable charge torque of the second motor 202 is determined to be −20 kgf·m which is a negative torque value as described above, the second vehicle controller 206 of the towed vehicle 200 may be configured to determine that the chargeable torque of the second motor 202 is −10 kgf·m smaller than −20 kgf·m.

At the present time, the second vehicle controller 206 of the towed vehicle 200 transmits the chargeable torque (e.g., −10 kgf·m) of the second motor 202 determined as described above to the first vehicle controller 106 of the towing vehicle 100 through communication.

Therefore, the second motor 202 may be driven by the chargeable torque to charge the second battery, and at the same time, the first motor and the hydraulic braking device may be driven by the distribution torque satisfying the braking demand torque.

To the present end, a charge compensation torque of the first motor is determined based on the chargeable torque of the second motor 202 (S305).

The first vehicle controller 106 of the towing vehicle 100 is configured to determine the charge compensation torque of the first motor based on the chargeable torque of the second motor 202 transmitted from the second vehicle controller 206 of the towed vehicle 200 and re-determines the first motor torque (regenerative braking torque) for satisfying the braking demand torque by the determined charge compensation torque of the first motor.

The charge compensation torque of the first motor may be determined to be a value obtained by subtracting the chargeable torque of the second motor 202 from the allowable charge torque of the second motor 202.

For example, as described above, to satisfy the braking demand torque of −100 kgf·m, when the chargeable torque of the second motor 202 is determined to be −10 kgf·m which is a negative torque value after the hydraulic braking torque is determined to be −60 kgf·m, the first motor torque is determined to be −20 kgf·m which is a negative torque value, and the allowable charge torque of the second motor 202 is determined to be −20 kgf·m which is a negative torque value, the charge compensation torque of the first motor may be determined to be −10 kgf·m obtained by subtracting the chargeable torque of −10 kgf·m from the allowable charge torque of −20 kgf·m.

Therefore, the first motor torque (regenerative braking torque) may be re-determined to be a level increased by the charge compensation torque of the first motor and for example, re-determined to be −30 kgf·m at which the first motor torque (regenerative braking torque) of −20 kgf·m which is a negative torque value is increased by the charge compensation torque of the first motor of −10 kgf·m which is a negative torque value.

Therefore, the hydraulic braking device may provide a hydraulic braking torque of −60 kgf·m, the first motor 102 may be driven by −30 kgf·m which is a negative torque value as a regenerative braking torque for charge of the first battery and deceleration, and the second motor 202 may also be driven by −10 kgf·m which is a negative torque value as a regenerative braking torque for charge of the second battery and deceleration, satisfying the braking demand torque of −100 kgf·m.

As the first motor torque is re-determined as described above, the sum of the chargeable torque of the second motor, the hydraulic braking torque, and the re-determined first motor torque may be determined to be a level satisfying the braking demand torque.

To the present end, the first vehicle controller 106 of the towing vehicle 100 instructs the first motor torque (regenerative braking torque) re-determined as described above to the first motor controller 105 and instructs the hydraulic braking torque to a brake controller (S306).

Therefore, the hydraulic braking device may perform braking by the instructed hydraulic braking torque under the control of the braking controller (S307), and the first motor 102 may be driven by the re-determined and instructed first motor torque (regenerative braking torque) under the control of the first motor controller 105 (S308).

For example, the first motor 102 may be driven by −30 kgf·m which is a negative torque value for charge of the first battery 103 and deceleration, the second motor 202 may be driven by −10 kgf·m which is a negative torque value for charge of the second battery 203 and deceleration, and the hydraulic braking device may perform hydraulic braking by the hydraulic braking torque of −60 kgf·m, satisfying the braking demand torque of −100 kgf·m.

Furthermore, not only the first battery 103 may be charged by the regenerative braking torque of the first motor 102 while the towing vehicle brakes, but also the second battery 203 may be easily charged by the chargeable torque (regenerative braking torque) of the second motor 202 of the towed vehicle.

To the present end, after the chargeable torque of the second motor 202 is determined in the operation (S304), the second vehicle controller 206 of the towed vehicle instructs the chargeable torque to the second motor controller 205 (S309).

Therefore, the second motor 202 may be configured to generate power and may be driven by the chargeable torque under the control of the second motor controller 205 (S310), and thus the second battery 203 of the towed vehicle may be easily charged by the power-generation and driving of the second motor 202 when the towing vehicle brakes.

Here, a process of executing the coasting charge mode upon deceleration will be described in detail as follows.

Figure 7:
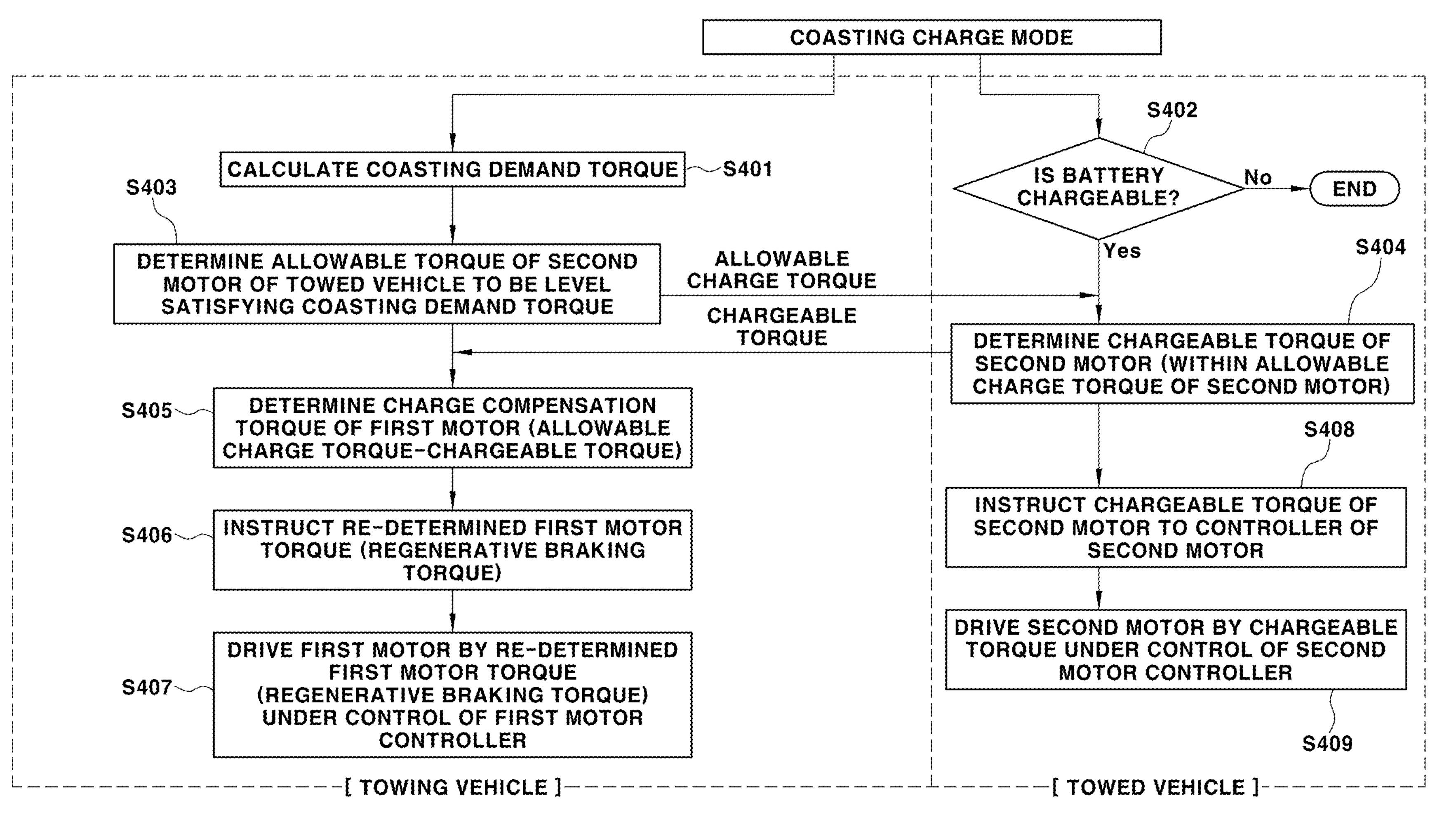
FIG. 7 is a flowchart showing a coasting charge mode upon deceleration in the method of controlling the towing mode of the eco-friendly vehicle according to an exemplary embodiment of the present disclosure.

FIG. 7 is a flowchart showing a coasting charge mode upon deceleration in the method of controlling the towing mode of the eco-friendly vehicle according to an exemplary embodiment of the present disclosure.

As described above, when the towing vehicle 100 is neither in an acceleration state nor in a braking state, that is, during coasting traveling in which the vehicle decelerates in a state in which the driver releases the accelerator pedal and the brake pedal, the coasting charge mode upon deceleration (S400) is executed to charge the second battery 203 of the towed vehicle 200.

To the present end, an operation of determining a coasting demand torque for deceleration upon coasting traveling is first performed (S401).

For example, the coasting demand torque may be determined by a predetermined logic previously set by the first vehicle controller 106 of the towing vehicle 100 based on non-detected signals of the accelerator pedal amount detector 107 and the brake pedal amount detector 108 in the state in which the driver releases the accelerator pedal and the brake pedal.

In the instant case, the second vehicle controller 206 of the towed vehicle 200 is configured to determine whether the second battery 203 of the towed vehicle is chargeable (S402).

For example, when the second battery 203 of the towed vehicle 200 is in a high-temperature state which is a critical temperature or higher or fails, battery charge limit power, that is, battery chargeable power may be zero, and thus it is determined that the second battery 203 of the towed vehicle 200 is in a chargeable state when the battery chargeable power is greater than zero.

Subsequently, the first vehicle controller 106 of the towing vehicle 100 is configured to determine that the allowable charge torque of the second motor 202 for charging the second battery 203 of the towed vehicle 200 is a level satisfying the coasting demand torque (S403).

The allowable charge torque of the second motor 202 refers to a torque which is determined, by distribution, so that the second battery 203 of the towed vehicle may be easily charged when the towing vehicle decelerates while satisfying the coasting demand torque.

For example, assuming that the coasting demand torque is −40 kgf·m, to satisfy the coasting demand torque of −40 kgf·m, the first vehicle controller 106 may determine, by distribution, that the first motor torque is −20 kgf·m which is a negative torque value for regenerative braking and charge of the first battery and the allowable charge torque of the second motor 202 is −20 kgf·m which is a negative torque value for regenerative braking and charge of the second battery.

It may be noted that the above torque values are only one example for the clear description and better understanding of the present disclosure and are not limited to the exemplary values.

Therefore, the first motor 102 may be driven by −20 kgf·m which is a negative torque value as a regenerative braking torque for charge of the first battery and deceleration, and the second motor 202 may also be driven by −20 kgf·m which is a negative torque value as a regenerative braking torque for charge of the second battery and deceleration, satisfying the coasting demand torque of −40 kgf·m.

At the present time, the first vehicle controller 106 of the towing vehicle 100 transmits the allowable charge torque of the second motor 202 of the towed vehicle 200 determined as described above to the second vehicle controller 206 of the towed vehicle 200 through communication.

Subsequently, the chargeable torque of the second motor 202 for charging the second battery 203 of the towed vehicle 200 is determined (S404).

The chargeable torque of the second motor 202 is determined to be a level within the allowable charge torque of the second motor 202 according to the SOC state of the second battery 203.

For example, as the amount of charge required for the second battery 203 of the towed vehicle 200 increases, the chargeable torque of the second motor 202 may be determined to be a greater value in the range of the allowable charge torque, and as the amount of charge required for the second battery 203 of the towed vehicle 200 decreases, the chargeable torque of the second motor 202 may be determined to be a smaller value in the range of the allowable charge torque.

When the second vehicle controller 206 of the towed vehicle 200 determines the chargeable torque of the second motor 202, as the SOC value of the second battery 203 is smaller than the reference value at which charge is required and is a level approaching the reference value, the second vehicle controller 206 of the towed vehicle 200 may be configured to determine that the chargeable torque of the second motor 202 is a smaller value in the range of the allowable charge torque of the second motor 202, and on the other hand, as the SOC value of the second battery 203 is a level which is away from the reference value, this is in a state in which the amount of charge required for the second battery increases, and thus the second vehicle controller 206 of the towed vehicle 200 may be configured to determine that the chargeable torque of the second motor 202 is a greater value in the range of the allowable charge torque of the second motor 202 to charge the second battery rapidly and smoothly.

For example, when the allowable charge torque of the second motor 202 is determined to be −20 kgf·m which is a negative torque value as described above, the second vehicle controller 206 of the towed vehicle 200 may be configured to determine that the chargeable torque of the second motor 202 is −10 kgf·m smaller than −20 kgf·m.

At the present time, the second vehicle controller 206 of the towed vehicle 200 transmits the chargeable torque (e.g., −10 kgf·m) of the second motor 202 determined as described above to the first vehicle controller 106 of the towing vehicle 100 through communication.

Therefore, the second motor 202 may be driven by the chargeable torque to charge the second battery and at the same time, the first motor 102 may be driven by a distribution torque satisfying the coasting demand torque.

To the present end, the charge compensation torque of the first motor is determined based on the chargeable torque of the second motor 202 (S405).

The first vehicle controller 106 of the towing vehicle 100 is configured to determine the charge compensation torque of the first motor based on the chargeable torque of the second motor 202 transmitted from the second vehicle controller 206 of the towed vehicle 200 and re-determines the first motor torque (regenerative braking torque) for satisfying the coasting demand torque by the determined charge compensation torque of the first motor.

The charge compensation torque of the first motor may be determined to be a value obtained by subtracting the chargeable torque of the second motor 202 from the allowable charge torque of the second motor 202.

For example, to satisfy the coasting demand torque of −40 kgf·m as described above, when the chargeable torque of the second motor 202 is determined to be −10 kgf·m which is a negative torque value after the first motor torque is determined to be −20 kgf·m which is a negative torque value and the allowable charge torque of the second motor 202 is determined to be −20 kgf·m which is a negative torque value, the charge compensation torque of the first motor may be determined to be −10 kgf·m obtained by subtracting the chargeable torque of −10 kgf·m from the allowable charge torque of −20 kgf·m.

Therefore, the first motor torque (regenerative braking torque) may be re-determined to be a level increased by the charge compensation torque of the first motor and for example, re-determined to be −30 kgf·m at which the first motor torque (regenerative braking torque) of −20 kgf·m which is a negative torque value is increased by the charge compensation torque of the first motor of −10 kgf·m which is a negative torque value.

Therefore, the first motor 102 may be driven by −30 kgf·m which is a negative torque value as a regenerative braking torque for charge of the first battery and deceleration, and the second motor 202 may also be driven by −10 kgf·m which is a negative torque value for charge of the second battery and deceleration, satisfying the coasting demand torque of −40 kgf·m.

Subsequently, the first vehicle controller 106 of the towing vehicle 100 instructs the first motor torque (regenerative braking torque) re-determined as described above to the first motor controller 105 (S406).

Therefore, the first motor 102 may be driven by the re-determined and instructed first motor torque (regenerative braking torque) under the control of the first motor controller 105 (S407).

For example, the first motor 102 may be driven by −30 kgf·m which is a negative torque value for charge of the first battery 103 and deceleration, and the second motor 202 may be driven by −10 kgf·m which is a negative torque value for charge of the second battery 203 and deceleration, satisfying the coasting demand torque of −40 kgf·m.

Furthermore, not only the first battery 103 may be charged by the regenerative braking torque of the first motor 102 while the towing vehicle brakes, but also the second battery 203 may be easily charged by the chargeable torque (regenerative braking torque) of the second motor 202 of the towed vehicle.

To the present end, after the chargeable torque of the second motor 202 is determined in the operation (S404), the second vehicle controller 206 of the towed vehicle instructs the chargeable torque to the second motor controller 205 (S408).

Therefore, the second motor 202 may be configured to generate power and may be driven by the chargeable torque under the control of the second motor controller 205 (S409), and thus the second battery 203 of the towed vehicle may be easily charged by the power-generation and driving of the second motor 202 upon coasting traveling of the towing vehicle 100.

Figure 8:
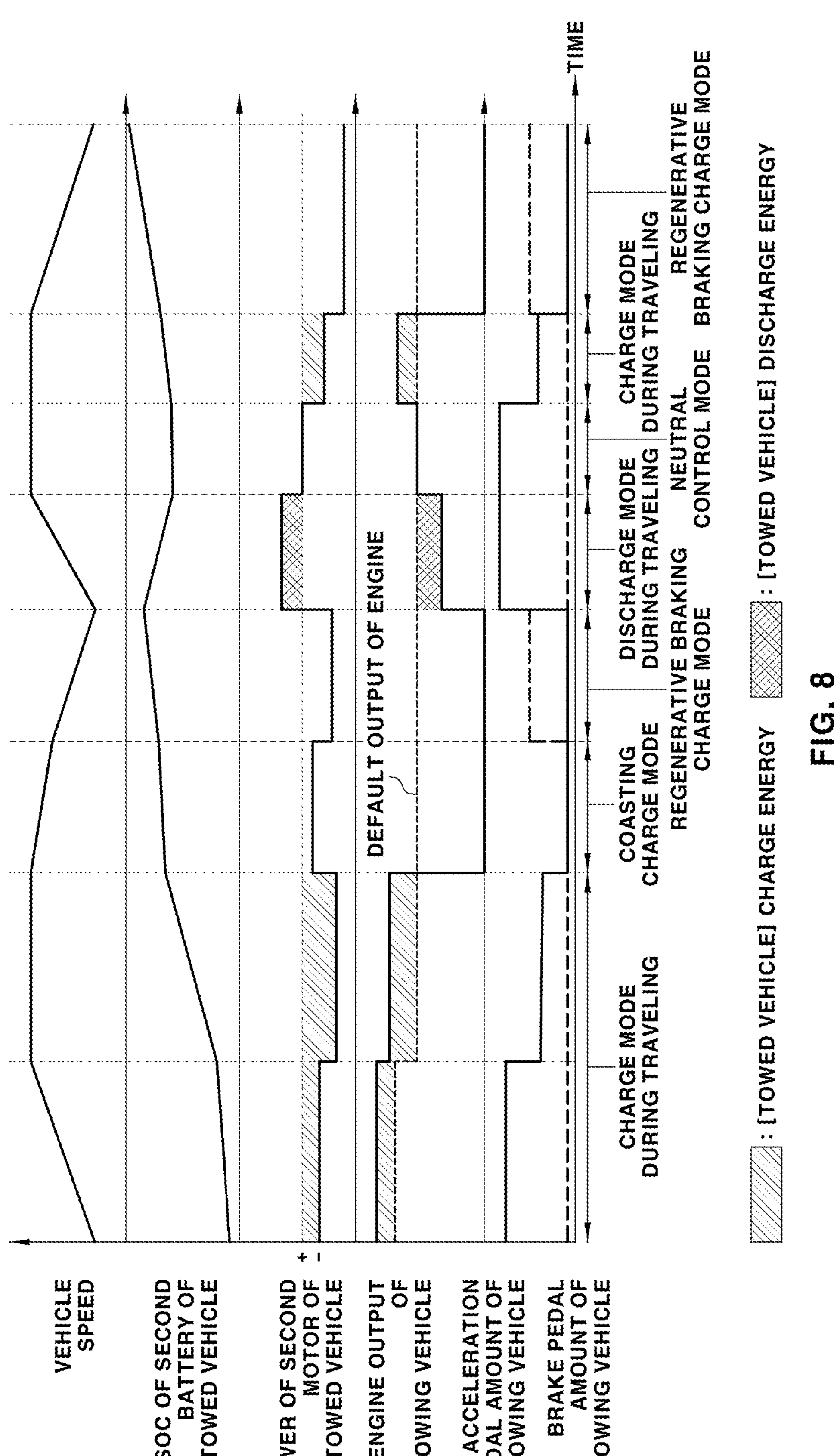
FIG. 8 is a control line diagram showing an example of the method of controlling the towing mode of the eco-friendly vehicle according to an exemplary embodiment of the present disclosure.

FIG. 8 is a control line diagram showing an example of the method of controlling the towing mode of the eco-friendly vehicle according to an exemplary embodiment of the present disclosure.

As shown in FIG. 8, the charge mode while driving is executed according to the SOC value of the second battery of the towed vehicle while the towing vehicle accelerates, and thus the second battery of the towed vehicle may be easily charged as the power of the second motor of the towed vehicle which is a negative torque is output.

Furthermore, the second battery of the towed vehicle may be charged by outputting the power of the second motor of the towed vehicle which is a negative torque according to the above-described coasting charge mode even while the towing vehicle coasts.

Furthermore, when the towing vehicle brakes, not only the power of the first motor of the towing vehicle which is a negative torque (regenerative braking torque) is output by the regenerative braking charge mode, but also the power of the second motor of the towed vehicle which is a negative torque (regenerative braking torque) is output, and thus the second battery of the towed vehicle may be charged.

Furthermore, when the first motor 102 is driven by the regenerative braking torque which is a negative torque because the first battery 103 of the towing vehicle needs to be charged, the second motor 202 of the towed vehicle assists the traveling driving force by the discharge mode during traveling, and thus the first battery may be easily charged and at the same time, the traveling satisfying the driver demand torque may be easily performed by the traveling force assist driving of the second motor 202.

The charge mode during traveling, the regenerative braking charge mode, the coasting charge mode, the discharge mode during traveling, and the like may be repeatedly performed according to situations when the towing vehicle 100 tows the towed vehicle 200 to the desired destination.

As described above, by charging the battery of the towed vehicle when the towing vehicle which is the hybrid electric vehicle among the eco-friendly vehicles tows the towed vehicle which is the electric vehicle or the hybrid electric vehicle, it is possible to improve the merchantability and convenience of the eco-friendly vehicle, such as using immediately the towed vehicle upon reaching the desired destination.

Furthermore, it is possible to easily perform the assist of the traveling driving force of the towing vehicle by driving the motor of the towed vehicle by the positive driving torque by discharging the battery of the towed vehicle when the assist of the traveling driving force of the towing vehicle is required in the state in which the towed vehicle does not need to be charged to the amount of charge of the battery of the towed vehicle greater than or equal to the reference value.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a towing mode of an eco-friendly vehicle, the method comprising:

setting a towing mode between a towing vehicle and a towed vehicle by a first vehicle controller of the towing vehicle and a second vehicle controller of the towed vehicle;

determining, by the first vehicle controller, whether a second battery of the towed vehicle needs to be charged, wherein the towing vehicle includes a first motor and a first battery and the towed vehicle includes a second motor and the second battery; and controlling charging of the second battery by executing different charge modes of the towing mode according to traveling conditions of the towing vehicle by the first vehicle controller, by charging the second battery of the towed vehicle while the towing vehicle tows the towed vehicle, wherein the executing different charge modes includes determining, by the first vehicle controller, a charge compensation torque of the first motor of the towing vehicle based on a chargeable torque of the second motor of the towed vehicle transmitted from the second vehicle controller of the towed vehicle and re-determining the first motor torque of the towing vehicle for satisfying a braking demand torque by the determined charge compensation torque of the first motor of the towing vehicle, and wherein the charging of the second battery of the towed vehicle is performed by selecting one of a charge mode during traveling, a regenerative braking charge mode, and a coasting charge mode for the charging of the second battery of the towed vehicle while the towing vehicle tows the towed vehicle so that the second motor of the towed vehicle is driven by a negative charge torque for charging the second battery while the towing vehicle accelerates or decelerates.

2. The method of claim 1, further including:

determining, by the first vehicle controller, whether an assist of a traveling driving force by driving of the second motor of the towed vehicle is required when the first vehicle controller concludes that the second battery does not need to be charged; and executing a discharge mode during traveling in which the assist of the traveling driving force by the driving of the second motor of the towed vehicle is performed when the first vehicle controller concludes that the assist of the traveling driving force is required.

3. The method of claim 2, further including determining whether to satisfy a traveling driving force assist entry condition before the discharge mode during traveling is executed, wherein the discharge mode during traveling is executed when the traveling driving force assist entry condition is satisfied.

4. The method of claim 2, including performing neutral control for a driving system of the towed vehicle when the first vehicle controller concludes that the assist of the traveling driving force by the driving of the second motor of the towed vehicle is not required.

5. The method of claim 1, wherein in the executing of the different charge modes according to the traveling conditions of the towing vehicle, one of the charge mode during traveling according to acceleration, the regenerative braking charge mode according to braking, and the coasting charge mode according to deceleration is executed.

6. The method of claim 5, wherein the charge mode during traveling includes:

determining a driver demand torque;

determining an allowable charge torque of the second motor of the towed vehicle for charging the second battery of the towed vehicle;

determining that the chargeable torque of the second motor for charging the second battery of the towed vehicle is in a range within the allowable charge torque; and driving the second motor by the chargeable torque to charge the second battery and at a same time, driving an engine and the first motor of the towing vehicle by a distribution torque satisfying the driver demand torque.

7. The method of claim 6, further including determining whether the second battery of the towed vehicle is chargeable, wherein determining the chargeable torque of the second motor when the second battery is chargeable is performed.

8. The method of claim 6, further including:

before the engine and the first motor are driven, determining an engine compensation torque by subtracting the chargeable torque of the second motor from the allowable charge torque of the second motor and re-determining that an engine torque is a level reduced by the engine compensation torque.

9. The method of claim 8, wherein as the engine torque is re-determined, a sum of the chargeable torque of the second motor, the re-determined engine torque, and a first motor torque is determined to be a level satisfying the driver demand torque.

10. The method of claim 2, wherein the discharge mode during traveling includes:

determining a driver demand torque;

determining an allowable discharge torque of the second motor for the assist of the traveling driving force;

determining that a dischargeable torque of the second motor for the assist of the traveling driving force is in a range within the allowable discharge torque; and driving the second motor by the dischargeable torque for the assist of the traveling driving force and at a same time, driving an engine and the first motor by a distribution torque satisfying the driver demand torque.

11. The method of claim 10, further including:

determining whether the second battery of the towed vehicle is dischargeable, wherein determining the dischargeable torque of the second motor when the second battery is dischargeable is performed.

12. The method of claim 10, further including:

before the engine and the first motor are driven, determining a first motor compensation torque by subtracting the dischargeable torque of the second motor from the allowable discharge torque of the second motor and re-determining that the first motor torque is a level reduced by the first motor compensation torque.

13. The method of claim 12, wherein, as the first motor torque is re-determined, a sum of the dischargeable torque of the second motor, an engine torque, and the re-determined first motor torque is determined to be a level satisfying the driver demand torque.

14. The method of claim 5, wherein the regenerative braking charge mode includes:

determining the braking demand torque;

determining an allowable charge torque of the second motor of the towed vehicle for charging the second battery of the towed vehicle;

determining that the chargeable torque of the second motor for charging the second battery of the towed vehicle is in a range within the allowable charge torque; and driving the second motor by the chargeable torque to charge the second battery and at a same time, driving the first motor of the towing vehicle and a hydraulic braking device by a distribution torque satisfying the braking demand torque.

15. The method of claim 14, further including:

determining whether the second battery of the towed vehicle is chargeable, wherein determining the chargeable torque of the second motor when the second battery is chargeable is performed.

16. The method of claim 14, further including:

before the first motor and the hydraulic braking device are driven, determining the charge compensation torque of the first motor by subtracting the chargeable torque of the second motor from the allowable charge torque of the second motor and re-determining that the first motor torque is a level increased by the charge compensation torque.

17. The method of claim 16, wherein as the first motor torque is re-determined, a sum of the chargeable torque of the second motor, a hydraulic braking torque, and the re-determined first motor torque is determined to be a level satisfying the braking demand torque.

18. The method of claim 5, wherein the coasting charge mode includes:

determining a coasting demand torque;

determining an allowable charge torque of the second motor of the towed vehicle for charging the second battery of the towed vehicle;

determining that the chargeable torque of the second motor for charging the second battery of the towed vehicle is in a range within the allowable charge torque; and driving the second motor by the chargeable torque to charge the second battery and at a same time, driving the first motor of the towing vehicle by a distribution torque satisfying the coasting demand torque.

19. The method of claim 18, further including:

determining whether the second battery of the towed vehicle is chargeable, wherein determining the chargeable torque of the second motor when the second battery is chargeable is performed.

20. The method of claim 18, further including:

before the first motor is driven, determining the charge compensation torque of the first motor by subtracting the chargeable torque of the second motor from the allowable charge torque of the second motor and re-determining that the first motor torque is a level increased by the charge compensation torque, wherein as the first motor torque is re-determined, a sum of the chargeable torque of the second motor and the re-determined first motor torque is determined to be a level satisfying the coasting demand torque.

* * * * *